UNITED STATES PATENT OFFICE.

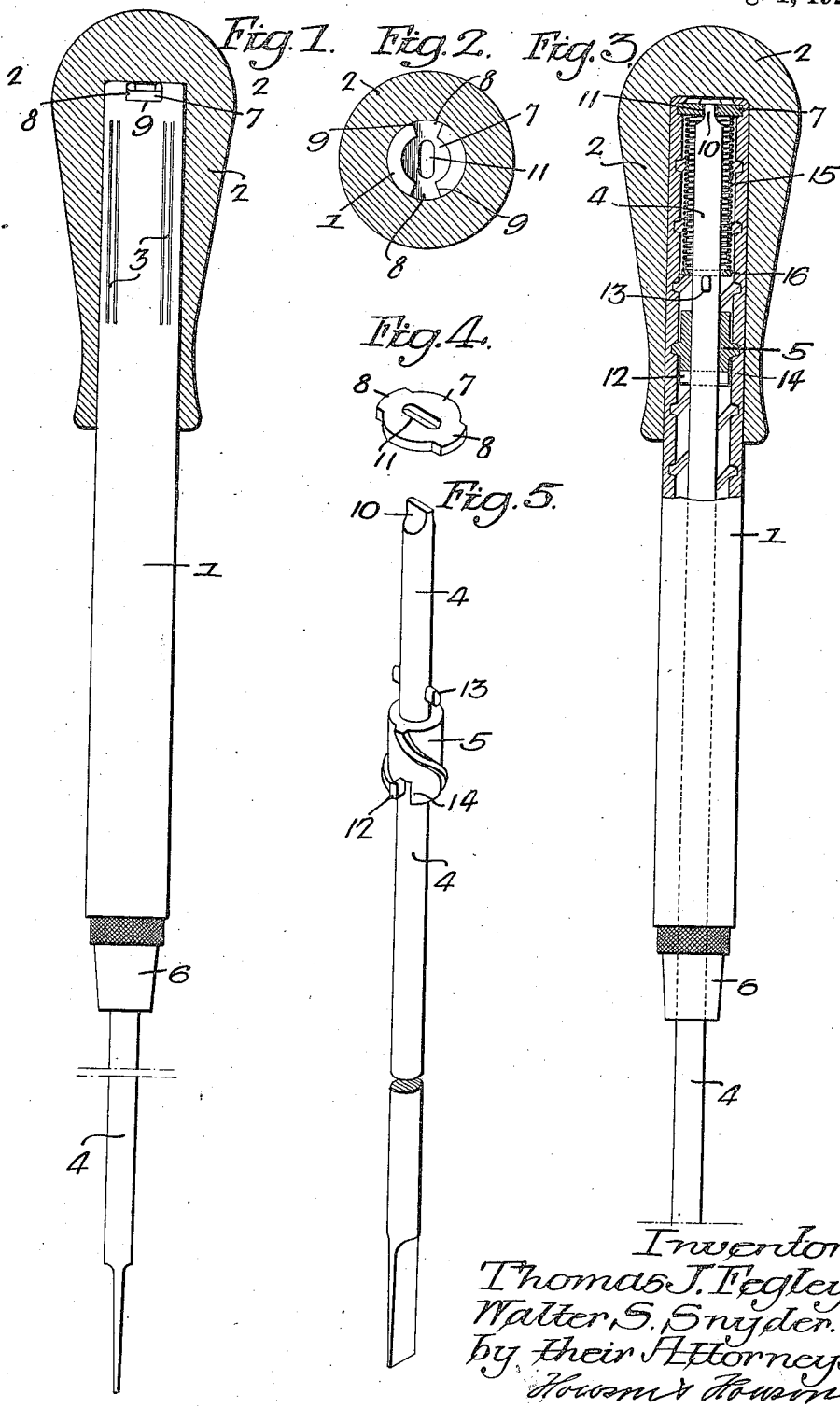

THOMAS J. FEGLEY AND WALTER S. SNYDER, OF PHILADELPHIA, PENNSYLVANIA, ASSIGNORS TO NORTH BRO'S. M'F'G. CO., OF PHILADELPHIA, PENNSYLVANIA, A CORPORATION OF PENNSYLVANIA.

SCREW DRIVER.

1,424,456.      Specification of Letters Patent.      Patented Aug. 1, 1922.

Application filed May 25, 1920. Serial No. 384,074.

*To all whom it may concern:*

Be it known that we, THOMAS J. FEGLEY and WALTER S. SNYDER, citizens of the United States, residing in Philadelphia, Pennsylvania, have invented certain Improvements in Screw Drivers, of which the following is a specification.

The object of this invention is to improve the construction of screw drivers of the type in which the spindle is turned by the longitudinal movement of the handle in one direction, and in which the handle when moved to the extreme position will be locked to the spindle.

In the accompanying drawings:

Fig. 1 is a side view of the screw driver, with the handle in section;

Fig. 2 is a section on the line 2—2, Fig. 1;

Fig. 3 is a view similar to Fig. 1, with the upper portion of the screw driver in section, the spring compressed and the spindle locked to the handle;

Fig. 4 is a detached perspective view of the locking plate; and

Fig. 5 is a perspective view of the spindle.

1 is the cylindrical section of the screw driver having two internal spiral grooves in the present instance, adapted to the grooves is a threaded sleeve 5, loosely mounted on the spindle 4, which extends through a ferrule 6 and into the cylindrical section 1. 2 is a wooden handle driven onto the cylindrical section 1, said section being provided with ribs 3, which cut into the wood of the handle and prevent the handle from turning on the said section. At the upper end of the cylindrical section is a locking plate 7 having projections 8 which extend into notches 9 in the end of the cylindrical section and the extreme end of the section is turned down over the plate to secure the plate rigidly to the section, as shown in Fig. 2. The upper end of the spindle 4 has a flattened portion 10 which is arranged to enter a slot 11 in the plate 7 so as to lock the spindle to the plate and to the cylindrical section 1. The sleeve 5 is located between two pins 12 and 13 and has a notch 14 in its outer end so as to engage the pin 12. The pins are so spaced as to allow the nut to be disengaged from the pin 12.

15 is a spring, which may or may not be used as desired, and is located between the locking plate 7 and a washer 16, resting on the pin 13. By this construction, we provide a very simple push screw driver and when the spindle is in engagement with the locking plate 7 it is rigidly connected with the cylindrical section of the screw driver.

The operation is as follows: When the spring is used the spindle is normally in a projected position, the sleeve 5 being at the outer end of the cylindrical section 1 and may be free of the spindle 4. As soon as pressure is applied to the handle 2, the sleeve 5 is forced into engagement with the pin 12 on the spindle and will turn the spindle positively. When the handle is in engagement with the head of a screw, it will turn the screw, but when the handle is pushed to the limit, it will engage the end of the spindle positively, freeing the sleeve 5. The device can then be used as an ordinary screw driver. When the spindle is free of the screw being driven, it will be projected by the spring and will detach itself from the sleeve. The sleeve will turn freely, being moved towards the outer end of the cylindrical section 1 by the pin 13, while the spindle will be projected without turning.

We claim:

1. The combination in a screw driver, of a cylindrical section, having a spiral groove therein; a locking plate secured to the said section at one end; a spindle having a reduced portion fitting a slot in the locking plate; and a sleeve on the spindle adapted to the spiral groove in the cylindrical section.

2. The combination of a cylindrical section notched at one end and having a spiral groove therein; a locking plate having projections adapted to the notches in the said section; and also having a slot; a spindle; and a sleeve on the spindle adapted to an internal groove in the cylindrical section, the end of the spindle being reduced to fit the slot in the locking plate when the spindle is at the extreme end of its movement.

3. The combination in a screw driver, of a cylindrical section having an internal spiral groove; a ferrule screwed into one end of the section, the other end of the section being notched; a slotted locking plate having projections adapted to the notches in the cylindrical section; a handle driven onto the end of the cylindrical section; a spindle having a pin; a sleeve loosely mounted on the spindle and having threads adapted to the groove in the cylindrical section and notched at its outer end to engage the pin on the spindle; a second pin on the spindle beyond the nut; a washer; and a spring between the washer and the locking plate.

THOMAS J. FEGLEY.
WALTER S. SNYDER.